Nov. 26, 1968     J. P. TAILOR     3,412,529

GAS SCRUBBING APPARATUS AND METHOD

Filed Feb. 28, 1966     2 Sheets-Sheet 1

INVENTOR
JOHN P. TAILOR

BY Wynned Finken,
ATTORNEYS

Nov. 26, 1968   J. P. TAILOR   3,412,529
GAS SCRUBBING APPARATUS AND METHOD
Filed Feb. 28, 1966   2 Sheets-Sheet 2

INVENTOR
JOHN P. TAILOR

BY Wynne & Finken
ATTORNEYS 3,412,529
GAS SCRUBBING APPARATUS AND METHOD
John P. Tailor, Box 597, Davenport, Iowa 52805
Filed Feb. 28, 1966, Ser. No. 530,616
8 Claims. (Cl. 55—94)

ABSTRACT OF THE DISCLOSURE

Gas scrubbing method and apparatus wherein an inwardly spiralling gas vortex is contacted with two annular films of scrubbing liquid, one film flowing down the outside of a perforated cylinder and the second film flowing down the inside of a concentric perforated cylinder inside the first cylinder.

---

This invention relates to gas scrubbing apparatus and method and is an improvement over the gas scrubber and method of my prior U.S. Patent No. 3,050,919.

Patent 3,050,919 discloses a scrubber and method wherein an inwardly swirling contaminated gas stream is passed through a vertically disposed tubular perforate baffle which has downwardly flowing films of scrubbing liquid on both inside and outside surfaces thereof and the cleaned gas is withdrawn from the zone inside the baffle. Such scrubbers have proved very efficient in use and consistently remove up to 99% of the solid contaminants in flue gases, cement kiln exhaust gas, smelter gases and the like.

It is among the objects of this invention to provide gas scrubbing apparatus which is highly efficient while more flexible in application and less expensive to construct than the scrubber of Patent 3,050,919.

A further object of this invention is to provide gas scrubbers which efficiently remove solid gas contaminants while requiring only a very low gas pressure drop and accordingly have low power requirements.

Another object is to provide a high efficient gas scrubbing method adaptable to a wide variety of applications.

A further object is to provide gas scrubbers which are able to clean gases having a wide temperature range of about 50° to 2200° F.

Another object is to provide gas scrubbers adaptable to a wide range of gas flow rates.

Other objects and advantages will be apparent to those skilled in the art from the detailed description herein.

The scrubber of the invention generally comprises an upright cylindrical housing having a scroll-like contaminated gas inlet, a first upright perforate cylindrical baffle mounted concentrically within the housing to define an outer annular zone between the first baffle and the housing, a second upright perforate cylindrical baffle mounted concentrically within the first baffle to define an intermediate annular zone between the first and second baffles and an inner zone within the second baffle, first liquid delivery means positioned at the upper end of said first baffle for delivering a downwardly flowing film of liquid to the outside surface of the first baffle, second liquid delivery means positioned within the inner zone for delivering a downwardly flowing film of liquid to the upper end of the inside surface of the second baffle, seal means at one end of the housing preventing egress of contaminated gas therefrom, and a scrubber gas outlet at the other end of the housing, the perforate baffles conducting swirling gas from the outer annular zone through the intermediate annular zone into the inner zone for flow to the outlet.

The gas scrubbing method of the invention generally comprises flowing contaminated gas in an inwardly spiralling vortex through two downwardly flowing films of scrubbing liquid, the first film flowing downwardly over the outside surface of a first perforated cylinder and the second film flowing downwardly over the inside surface of a second perforated cylinder inside and concentric with the first cylinder and withdrawn cleaned gas from the zone inside the second cylinder.

Figure 1:
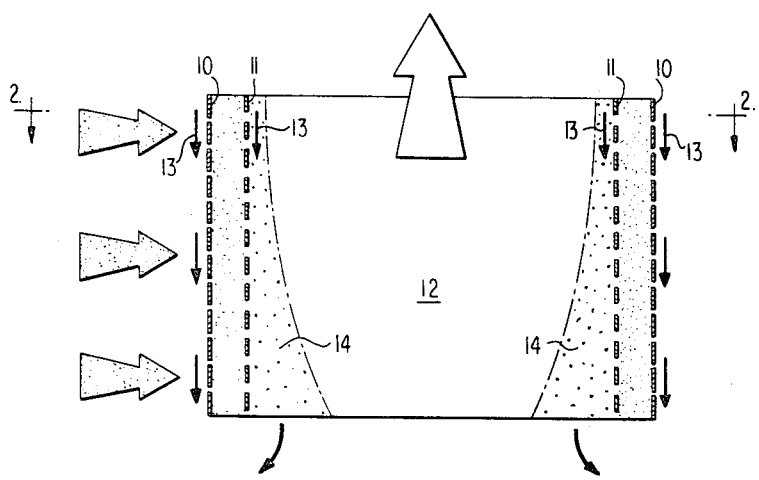
FIG. 1 is a schematic showing of an up-flow scrubber embodying the principles of the invention.
Figure 2:
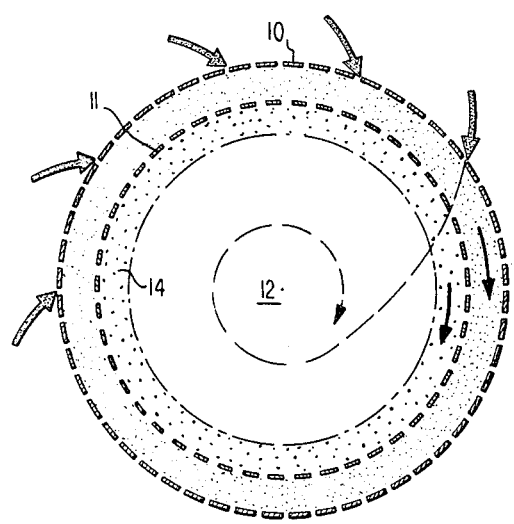
FIG. 2 is a cross-section taken along lines 2—2 of FIG. 1.
Figure 3:
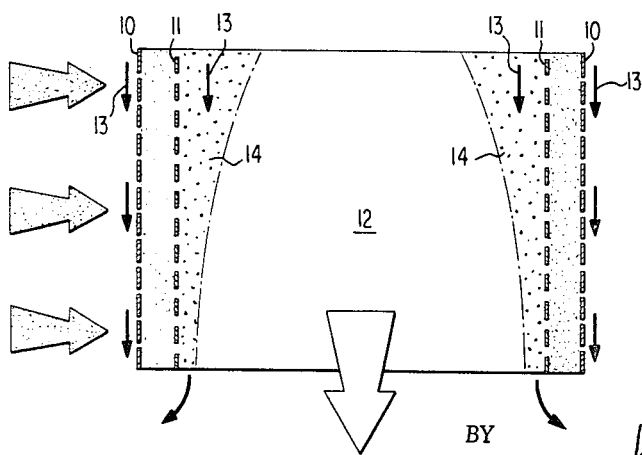
FIG. 3 is a schematic showing of a down-flow scrubber embodying the principles of the invention.

Referring to FIGS. 1-3, a scrubbing contact cylinder 10 consisting of a perforate baffle is positioned within an upright housing (not shown). Concentrically positioned within cylindrical baffle 10 is a second perforate baffle 11, referred to as the agglomerating contact cylinder. Contaminated gas is directed in an inwardly spiralling vortex, as indicated in FIG. 2 and ultimately passes through the cylinders 10 and 11 to the inner zone 12. Films of scrubbing liquid are flowed downwardly over the outside surface of cylinder 10 and over the inside surface of cylinder 11 as indicated by the arrows 13.

The film of washing liquid on the outside of cylinder 10 is in part broken up and passes into the annular zone between the cylinders wherein it becomes a fine fog or mist. The film of liquid on the inside surface of the cylinder 11 is initially held against the cylinder by centrifugal force and ultimately forms relatively large droplets which fall to be collected and recirculated after removal of the solids. The baffle surfaces are continually washed thereby preventing deposition or build-up of solids thereon. Clean gas is exhausted upwardly from the zone 12 in the scrubber of FIG. 1 and downwardly from zone 12 in FIG. 3. The zone of agglomerated drops or large droplets is indicated at 14. The ends of the cylinders are sealed by liquid or structural seals so as to make the path through the cylinder the only one available to contaminated gas. As the gas approaches the perforated baffles it is given rotation about the axis of the cylinders thereby creating a balanced vortex.

It has been found that cylinder 10 having about 5 to 10% open area and cylinder 11 having from 24 to 40% open area provides optimum separation and no entrainment of liquid particles in the clean gas. The perforations in cylinder 10 are of the order of 0.25 to 0.5 inch in diameter and those in cylinder 11 on the order of 0.5 to 0.75 inch in diameter. The gas velocity through the outer perforated cylinder 10 is preferably about 40 to 120 feet per second and through the inner cylinder 11 about 10 to 40 feet per second.

Figure 4:
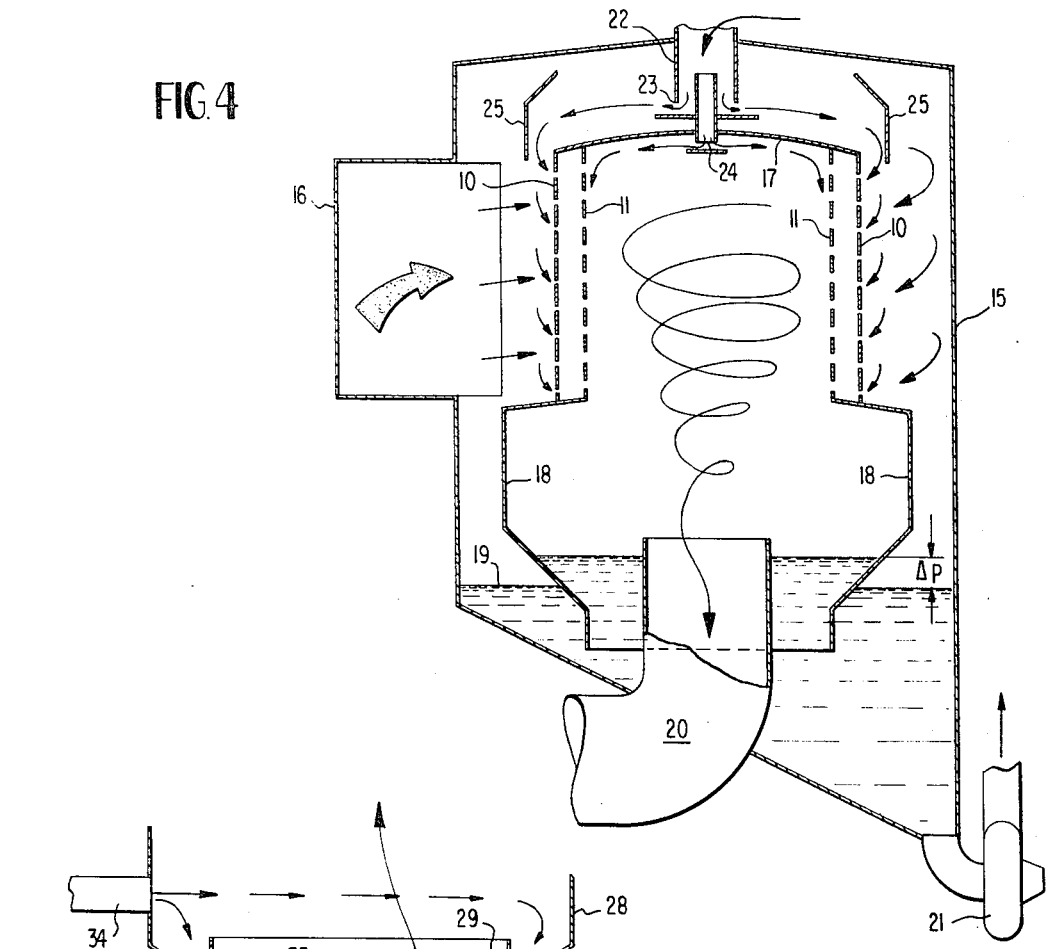
FIG. 4 is a view in cross-section, partly schematic, showing a down-flow scrubber embodying the principles of the invention.

FIG. 4 illustrates a down-flow scrubber constructed in accordance with the invention. A cylindrical housing 15 is provided with a tangential scroll inlet 16 as in the scrubber of Patent No. 3,050,919. Perforate cylindrical baffles 10 and 11 are provided as described with reference to FIGS. 1-3, and are provided with a top sealing member 17 and bottom seal member 18 extending into washing liquid 19 contained in the lower portion of the housing. Clean gas outlet 20 extends above the liquid level 19. Pump 21 delivers washing liquid and solids to a cyclone separator or other separation means (not shown) and the liquid recycled via pipe 22 to two spray heads 23 and 24. Upper spray head 23, above the top seal 17, directs a sheet-like spray outwardly against annular deflecting baffle 25 from which it is deflected downwardly over the outside surface of perforated cylinder 10. The lower spray head 24 directs the liquid onto the inner surface of perforated cylinder 11. The pressure drop in the gas is indicated by the symbol ΔP.

Figure 5:
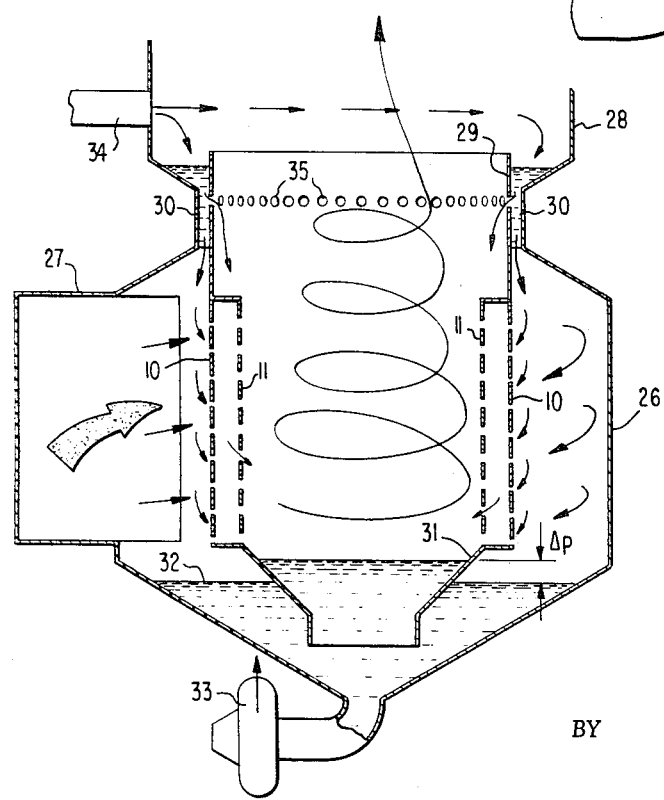
FIG. 5 is a view in cross-section, partly schematic, showing an up-flow scrubber embodying the principles of the invention.

In the up-flow scrubber of FIG. 5 the housing is shown at 26, scroll inlet for contaminated gas at 27 and gas outlet at 28. An annular cylindrical member 29 seals the upper end of the annular space between the perforated cylinders 10 and 11 and housing 28 is restricted adjacent the cylinder 29 to provide a restricted throat portion 30. The lower end of cylinders 10 and 11 is sealed by sealing member 31 which extends beneath liquid level 32 in the lower portion of the housing. Pump 33 delivers contaminated liquid to a solids separator (not shown) and clean washing liquid to pipe 34 where it fills the throat section 30 to form a liquid seal and the liquid flows downwardly over the outside surface of perforated cylinder 10. Cylindrical member 29 is provided with perforations or slits 35 for delivering liquid to the inside surface thereof from whence it flows down onto inside surface of perforated cylinder 11.

When employed on hot contaminated gases, the gas stream is first quenched with washing liquid to cool and humidify it and to bring it into approximate equilibrium temperature with the washing liquid. Scrubbers of this invention have operated successfully on cement kiln gas containing 7.5 grains of solids per cubic foot, aluminum smelter fumes containing 2 grains per cubic foot at a temperature of 600° F. and coal fired boiler flue gas containing about 2 grains solids per cubic foot. The overall pressure drop in such installations ranges from about 1 to 10 inches of water.

The down-flow scrubber of FIG. 4 finds particular application which require the use of a suction fan to move the gas. The fan, at the discharge end of the scrubber, contacts only clean gas and may be positioned on a floor, for example. The up-flow scrubber of FIG. 5 may be used on stacks, etc. which discharge gas under sufficient pressure to overcome the pressure drop within the scrubber.

It will be apparent that many modifications may be made, such as the use of weirs and the like to distribute washing liquid onto the perforated cylinder. The invention is operable with any washing liquid, although water will be used most extensively due to economic considerations. The invention also is operable on gases containing gaseous contaminants which dissolve in the washing liquid, such as sulfurous gases and the like.

While the invention has been described with reference to certain embodiments, they are to be considered illustrative rather than limiting and it is intended to cover all modifications which fall within the spirit and scope of the appended claims.

I claim:

1. Gas scrubbing apparatus for producing continuous intimate contact between a liquid and a contaminated gas comprising an upright cylindrical housing having a scroll-like contaminated gas inlet, a first upright perforate cylindrical baffle mounted concentrically within said housing to define an outer annular zone between said first baffle and said housing, a second upright perforate cylindrical baffle mounted concentrically within said first baffle to define an intermediate annular zone between said first and second baffles and an inner zone within said second baffle, first liquid delivery means positioned at the upper end of said first baffle for delivering a downwardly flowing film of liquid to the outside surface of said first baffle, second liquid delivery means positioned within said inner zone for delivering a downwardly flowing film of liquid to the upper end of the inside surface of said second baffle, seal means at one end of said housing preventing egress of contaminated gas therefrom, a scrubbed gas outlet at the other end of said housing, and means including said perforated baffles for conducting swirling gas from said outer annular zone through said intermediate annular zone into said inner zone for flow to said outlet.

2. Apparatus set forth in claim 1 wherein said seal means seals the upper end of said housing and said outlet is at the lower end of said housing providing downward flow of gas to said outlet.

3. Apparatus set forth in claim 1 wherein seal means at lower ends of both said baffles extend into liquid providing a liquid seal.

4. Apparatus set forth in claim 1 wherein said seal means seals the lower end of said housing and said outlet is at the upper end of said housing providing upward flow of gas to said outlet.

5. Apparatus set forth in claim 1 wherein said first perforate baffle has about 5 to 10% open area and said second perforate baffle has about 24 to 40% open area.

6. The method of contacting contaminated gas with a scrubbing liquid comprising flowing the gas in an inwardly spiralling vortex through two downwardly flowing films of scrubbing liquid, the first said film of scrubbing liquid flowing downwardly over the outside surface of a first perforated cylinder and the second said film of scrubbing liquid flowing downwardly over the inside surface of a second perforated cylinder inside and concentric with said first cylinder and withdrawing cleaned gas from the zone inside said second perforated cylinder.

7. The method set forth in claim 6 wherein the clean gas is withdrawn upwardly from said zone inside the second cylinder.

8. The method set forth in claim 6 wherein the clean gas is withdrawn downwardly from said zone inside the second cylinder.

References Cited

UNITED STATES PATENTS

| 2,511,713 | 6/1950 | Hoyle et al. | 55—238 |
| 2,816,490 | 12/1957 | Boadway et al. | 55—460 |
| 3,028,151 | 4/1962 | Kittel | 261—79.1 |
| 3,050,919 | 8/1962 | Tailor | 55—90 |

FOREIGN PATENTS

| 883,577 | 11/1961 | Great Britain. |
| 62,804 | 8/1940 | Norway. |

REUBEN FRIEDMAN, *Primary Examiner.*

C. N. HART, *Assistant Examiner.*